US006883171B1

United States Patent
Bittner, Jr. et al.

(10) Patent No.: US 6,883,171 B1
(45) Date of Patent: Apr. 19, 2005

(54) DYNAMIC ADDRESS WINDOWING ON A PCI BUS

(75) Inventors: Ray A. Bittner, Jr., Redmond, WA (US); Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/324,905

(22) Filed: Jun. 2, 1999

(51) Int. Cl.[7] ............................................... G06F 9/46
(52) U.S. Cl. .................. 718/108; 718/102; 711/220; 712/228
(58) Field of Search ............................. 718/102, 108, 718/100, 103, 107; 711/220, 206; 712/228; 709/100, 102, 103, 107, 108; 710/3

(56) References Cited

U.S. PATENT DOCUMENTS

| 5,201,039 A | * | 4/1993 | Sakamura ................ 711/201 |
| 5,390,301 A | * | 2/1995 | Scherf .................... 709/321 |
| 5,421,014 A | * | 5/1995 | Bucher .................... 709/100 |
| 5,655,132 A | * | 8/1997 | Watson ................... 709/104 |
| 5,680,598 A | * | 10/1997 | Farrell et al. ........... 712/227 |
| 5,887,190 A | * | 3/1999 | Priem et al. ............... 710/3 |
| 5,918,050 A | * | 6/1999 | Rosenthal et al. ........ 718/108 |
| 5,995,750 A | * | 11/1999 | Samson et al. .......... 718/107 |
| 6,230,259 B1 | * | 5/2001 | Christie et al. ......... 712/228 |
| 6,324,594 B1 | * | 11/2001 | Ellis et al. ................ 710/5 |
| 6,401,138 B1 | * | 6/2002 | Judge et al. ............. 709/328 |
| 6,526,431 B1 | * | 2/2003 | Bigbee et al. ........... 718/108 |
| 2003/0191927 A1 | * | 10/2003 | Joy et al. ................ 712/228 |

* cited by examiner

Primary Examiner—Lewis A. Bullock, Jr.
Assistant Examiner—Lilian Vo
(74) Attorney, Agent, or Firm—Lee & Hayes, PLLC

(57) ABSTRACT

A multi-tasking operating system and method updates PCI address values in an extension register to ensure that various threads utilize the correct values when accessing peripheral PCI devices. When application program threads require access to a PCI device, the operating system writes the high order bits of the PCI device address to two places: (1) the extension register of the PCI host bridge to allow immediate addressing of the PCI device, and (2) separate memory locations associated with the threads. When a context switch occurs from a first thread to a second thread, the operating system retrieves the stored value from the memory location associated with the second thread and writes the value to the extension register. In this manner, when the second thread requires access to its PCI device, the proper address value is already located in the extension register.

37 Claims, 4 Drawing Sheets

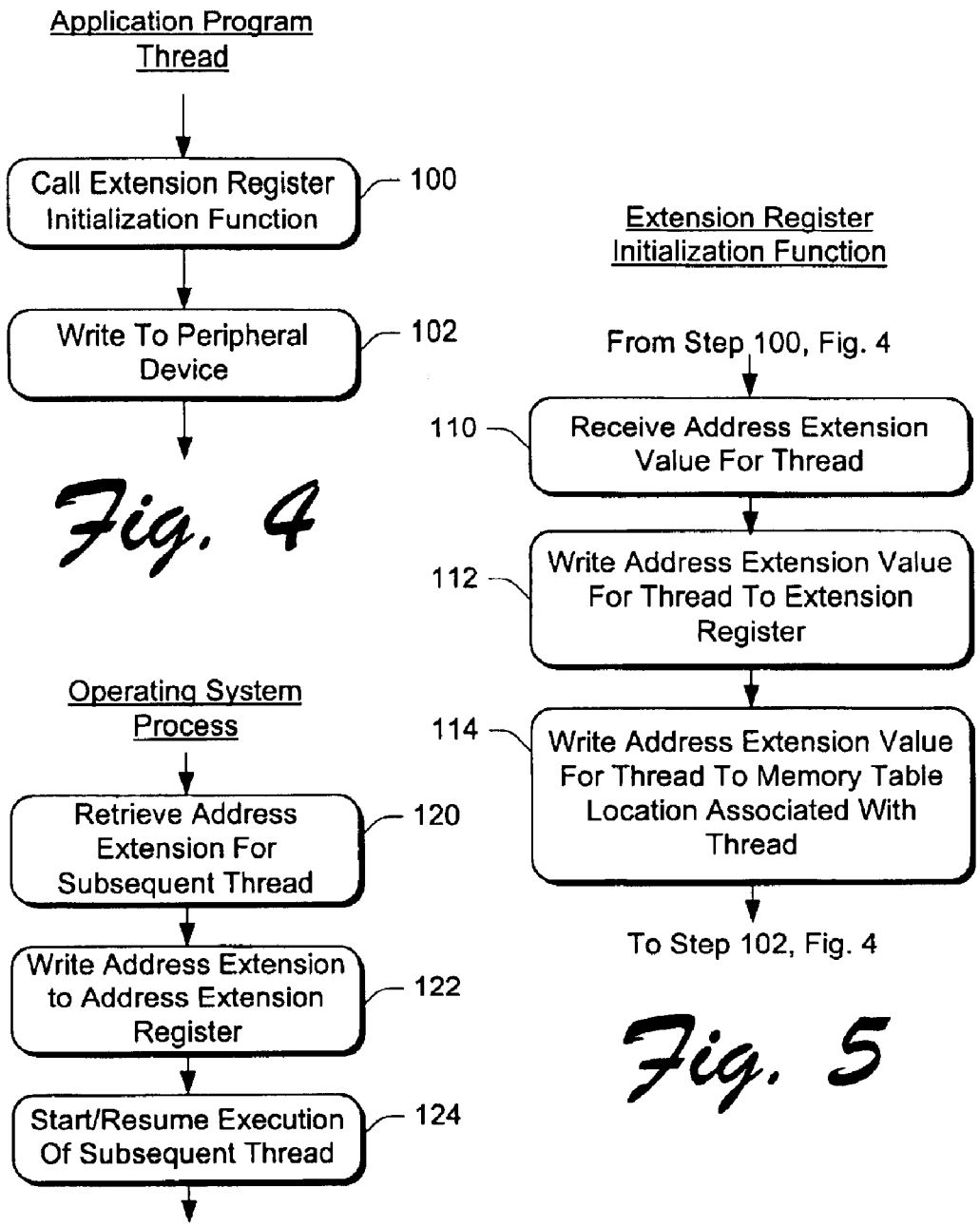

DYNAMIC ADDRESS WINDOWING ON A PCI BUS

TECHNICAL FIELD

This invention relates to the field of digital computer systems, and more particularly, to the addressing of PCI devices in a general-purpose multi-tasking operating system having a CPU which provides a number of address lines less than that required by a PCI device bus.

BACKGROUND

Digital computer operating systems periodically schedule processes for the central processing unit (CPU) of the computer to perform. The operating system schedules sub-parts of executable applications, known as threads, on the CPU. In multi-tasking operating systems, threads can be independently scheduled for execution on the processor so that more than one computer program or application may proceed at the same time. While the CPU only works on one thread at a time, it appears to the user that the CPU is running multiple applications concurrently. During multi-tasking, the CPU interrupts execution of one thread to begin execution of another thread or to resume execution of a previously interrupted thread. Switching from one thread to another is known as a "context switch."

One multi-tasking operating system currently available is the "WINDOWS CE" operating system developed by Microsoft Corporation. "WINDOWS CE" supports a wide variety of CPUs. Many of these CPUs do not provide full 32-bit addressing on the external pins of the device. This presents a problem in that many of today's computer systems utilize fast I/O devices with high-speed 32-bit buses, such as the industry standard peripheral component interconnect (PCI) bus. PCI devices, such as video controllers, are assigned a range of contiguous addresses on the bus through which they may be accessed.

To enable access to several PCI devices, each PCI device is assigned a unique, non-overlapping address range, whereby the high order bits of the 32-bit address are used to distinguish among address spaces for different devices. For instance, the upper two bits of a 28-bit address might be used to differentiate between four different PCI devices, with the remaining 26 bits being used for addressing within the devices themselves. Unfortunately, the CPU itself may not support 28 bits, but only 26 bits. Accordingly, there is no way for the CPU to distinguish amongst the different PCI devices on the bus. When a CPU is incapable of providing the full 32-bit PCI address space, there is a need to extend the addressing output of the CPU to properly access a PCI device connected to a PCI bus.

Special chips, referred to as "PCI host bridges," are available to interface a CPU to a PCI bus. Some of these chips have circuitry for extending the limited address range of CPUs such as those discussed above.

FIG. 1 shows a system utilizing a PCI host bridge. The system includes a prior art computer 10 having a microprocessor 12 coupled to a PCI host bridge 14. The microprocessor 12 has a central processing unit (CPU) 16. The CPU 14 is connected to multiple devices, such as a PCMCIA driver 18, a universal serial bus (USB) 20, an I/O (input/output) port 22, and a bus interface unit (BIU) 24, via an address bus 26. The BUI 24 interfaces the microprocessor 12 to the PCI host bridge 14 via a standard address bus 30 having less than thirty-two lines. The PCI host bridge 14 converts addresses received from the address bus 30 to full 32-bit addresses output over a 32-bit PCI bus 32. One or more PCI devices are coupled to the PCI bus 32, as represented by devices 34a, 34b, and 34c.

The PCI host bridge 14 has an extension register 36 to extend the address on the bus 32 (i.e., less than 32 bits) to a fill 32-bit address suitable for the PCI bus 32. More particularly, the extension register 36 contains memory to store a number of bits which are concatenated with lower-order bits from the standard address bus 30 to produce a full 32-bit address for one of the PCI devices 34.

The extension register 36 is read from and written to by the CPU 16 to allow the CPU to set the value of the high order address bits. By changing the values in the extension register, the CPU 16 is able to address the full address space supported by the PCI bus 32. For example, assume that a CPU 16 outputs a 26-bit address on bus 30. Further assume that one of the PCI devices 34 is a video device that has been assigned an address range of A4000000 through A7FFFFFF (expressed in hexadecimal notation). To address the video device, the CPU 16 writes the binary value 101001 to the extension register 36 to set the upper six bits of the PCI address. The external address pins of the CPU 16 then supply the low order twenty-six bits during normal bus cycle generation. If the CPU is then required to address a different PCI device, the CPU 16 changes the value in the extension register 36 to match the high order address bits of the target PCI device. For example, if the second PCI device is mapped to the address range of A8000000 through ABFFFFFF, the CPU 16 writes binary value 101010 to the extension register 36 and supplies the lower order twenty-six bits of the address during the bus cycle generation.

The procedure operates adequately within a non-multi-tasking environment, but not in a multi-tasking operating system environment. In present multi-tasking systems, the operating systems are designed to work with specific CPUs that only supply an adequate number of address lines, thereby avoiding the problem described above. The operating system may update the extension register once at system initialization and never update it again since the address bits supplied by the extension register are common across all PCI devices. This situation does not pose any problems because the correct address is generated while the PCI device is accessed.

However, consider the situation of a multi-tasking operating system working with CPUs that do not provide a sufficient number of address lines. The process described must be maintained even though the operating system may suspend or resume execution of a particular thread at any given time. This poses some potentially troublesome problems in that the extension register may contain the wrong values as a result of the context switching performed by the multi-tasking operating system.

Suppose, for example, two threads A and B are accessing PCI devices 1 and 2, respectively, via the PCI host bridge. Thread A needs the extension register set to a value "X" to access PCI Device 1 and thread B requires the extension register to have a value "Y" to access PCI Device 2. Table 1 describes the situation.

TABLE 1

Inter-process Conflict In A Multi-tasking Operating System

| Time | Thread A | Thread B | Extension Register Value |
|---|---|---|---|
| T0 | Extension Register = X | | X |
| T1 | Access PCI Device 1 | | X |
| T2 | | Context Switch | X |
| T3 | | Extension Register = Y | Y |
| T4 | | Access PCI Device 2 | Y |
| T5 | | Context Switch | Y |
| T6 | Access PCI Device 1 | | Y |

At time T0, thread A requests the CPU to set the extension register to value X. The CPU then accesses PCI device 1 at time T1. At time T2, the operating system performs a context switch and schedules thread B for execution. At time T3, thread B requests the CPU to set the extension register to value Y. The CPU then accesses PCI device 2 at time T4.

Thereafter, the operating system performs another context switch at time T5 to return to thread A for more execution. However, note that the extension register value remains at the value Y (the value for thread B) rather than the value X for thread A. The value in the extension register is not updated at this time because such an update only occurs when a thread—in this case, thread A—is initially called. As a result, when thread A attempts to access PCI device 1 again at time T6, the extension register contains value Y (i.e., the extension value for PCI device 2) and the access attempt fails.

One way to resolve this problem is to disable the context switching in the operating system while a PCI device is being accessed. This, however, could compromise the performance of the operating system since it may result in "jerky" operation of the applications being performed and would adversely affect the illusion of multi-tasking to the user. Additionally, in time-critical, real-time operating systems that are used in critical medical equipment or aircraft flight control systems, it is absolutely necessary to guarantee that context switches will occur within a specific time period. If context switching is disabled for an arbitrary period of time while a PCI device is being accessed in such a system, the time-critical thread may not execute within its allotted time period, thereby causing failure of the critical system.

A better solution to the problem is to provide a way for the operating system to restore the value of the extension register prior to each context switch so that the correct PCI device is accessed by the operating system every time. This solution is accomplished by the present invention.

SUMMARY

The present invention concerns a multi-tasking operating system and method that updates extension register values to ensure that various threads utilize the correct values to access corresponding PCI devices. In this manner, when execution of an interrupted thread is resumed, the thread will be able to access the correct PCI device.

When a first thread of an application program requires access to a PCI device, the operating system writes the high order bits of the PCI device address to two places: (1) the extension register of the PCI host bridge and (2) a separate memory location associated with the first thread. Similarly, when a second thread is started (i.e., the first thread is suspended) and desires access to a second PCI device, the operating system writes the high order bits of the second PCI device address to two places: (1) the extension register of the PCI host bridge and (2) a second memory location associated with the second thread. In the described implementation, the separate memory locations are implemented as a table that holds the upper address bits of a PCI device addresses in correlation with the threads that call the devices.

When a subsequent context switch occurs from the second thread back to the first thread (i.e., the second thread is suspended and execution of the first thread is resumed), the operating system retrieves the stored value from the memory location associated with the first thread and writes the value to the extension register. Therefore, when the first thread tries to access its particular PCI device, the proper value is already located in the extension register and can be concatenated with the CPU output address to access the PCI device.

When the next context switch to the second thread occurs, the operating system retrieves the stored value from the memory location associated with the second thread and writes the value to the extension register. Therefore, the proper value is located in the extension register so that the correct PCI device is accessed by the second thread.

BRIEF DESCRIPTION OF THE DRAWINGS

FIGS. 4–6 is a flow diagram of a process for managing the extension register to update values therein with each context switch among multiple threads. FIG. 4 shows steps implemented by an application program (or its corresponding thread and driver). FIG. 5 shows steps performed by a multi-tasking operating system. FIG. 6 shows steps performed by the extension register initialization function.

DETAILED DESCRIPTION

The present invention concerns a multi-tasking operating system and methods that enable extension of reduced-size addresses output by a CPU to full-size addresses carried over a PCI bus for accessing various PCI devices. The multi-tasking operating system may be implemented in a number of computing devices. For discussion purposes, the operating system is described in the context of a handheld computer.

Figure 1:
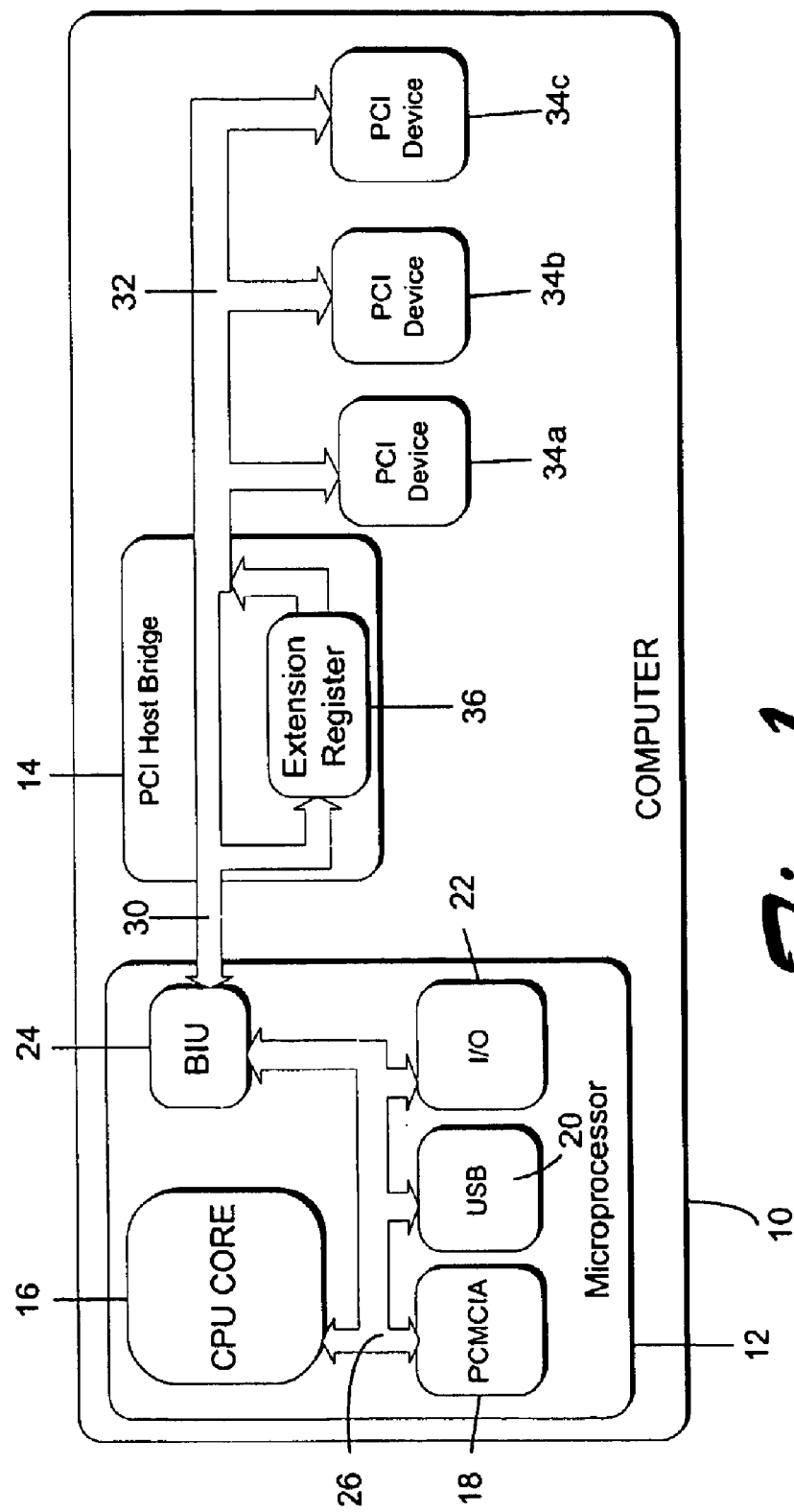
FIG. 1 is a block diagram of a prior art computer having a microprocessor interfacing with a PCI host bridge to provide a PCI address to multiple PCI devices via a PCI bus.
Figure 2:
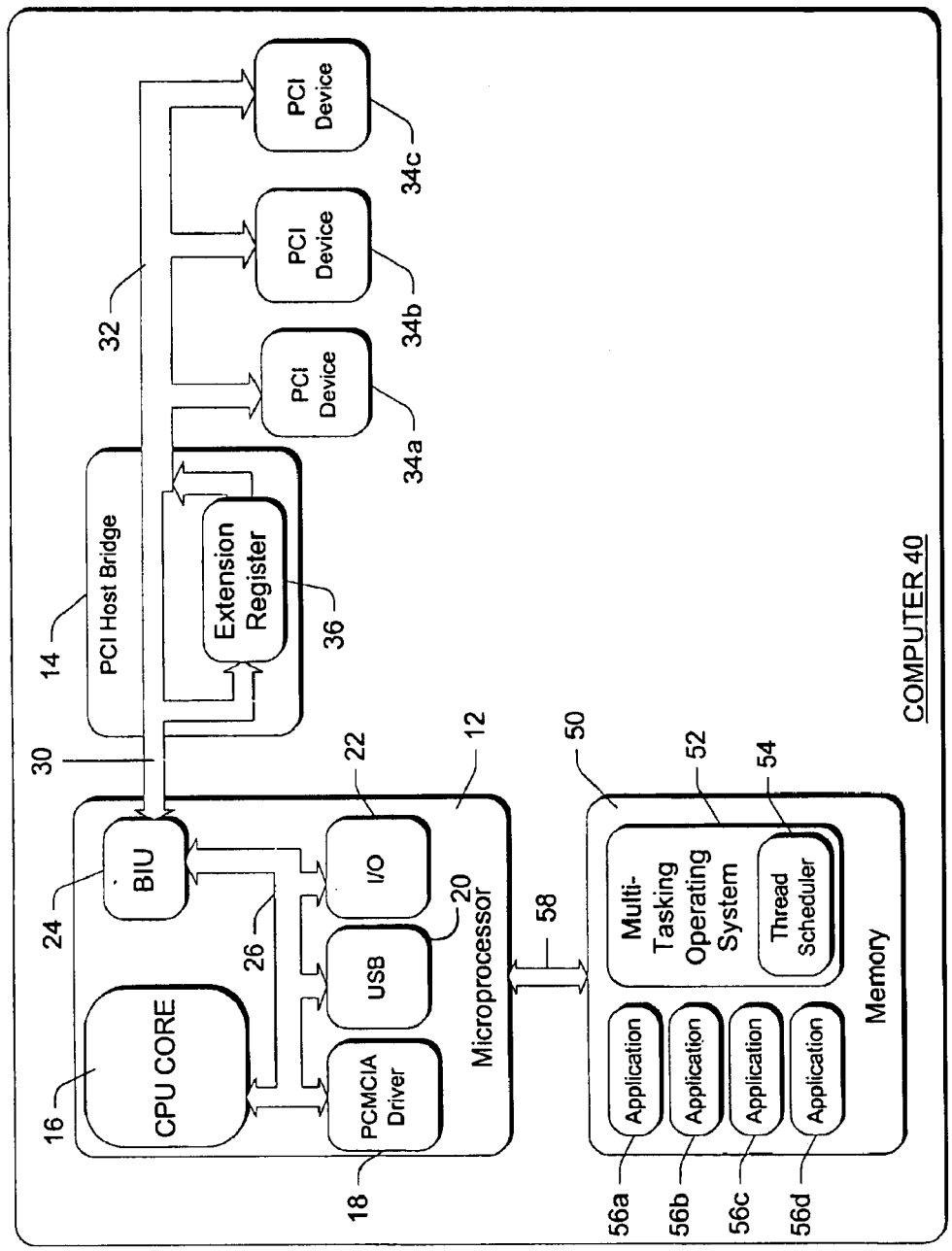
FIG. 2 is a block diagram of a computer having a multi-tasking operating system with a thread scheduler for scheduling threads in conjunction with a PCI host bridge to enable access to PCI devices on a PCI bus.

FIG. 2 is a block diagram showing pertinent functional components of a computer 40 in which the present invention may be implemented. The computer 40 is similarly constructed as computer 10 in FIG. 1 with respect to microprocessor 12, PCI host bridge 14, and PCI devices 34*a*–34*c*. The microprocessor 12 outputs reduced-sized addresses (e.g., less than 32 bits) on bus 30, and the PCI host bus 14 extends the addresses to full-size 32-bit addresses for the PCI bus 32.

The computer 40 has a nonvolatile memory 50 that stores a multi-tasking operating system 52 with a thread scheduler 54. The multi-tasking operating system 52 supports concurrent operation of multiple application programs, as represented by four applications 56a, 56b, 56c, and 56d (although more or less applications may be used). The microprocessor 12 communicates with the memory 50 via a standard data bus 58, which is well known in the art.

The multi-tasking operating system 52 assigns threads for associated applications 56a, 56b, 56c, and 56d. As noted in the Background, one problem encountered in the context of multi-tasking operating systems executing on CPUs with less than the number of address pins for full bus addressing occurs during context switching among the multiple threads. A context switch occurs whenever the multi-tasking operating system interrupts one thread to execute another thread. The problem is that, following a context switch, the extension register 36 may not contain the appropriate value for the current thread to access a PCI device on the PCI bus, but instead might contain a value used by a previously executed thread.

To overcome this problem, the multi-tasking operating system 52 stores the addressing values used in the extension register 36 for each thread and updates the extension register 36 each time the multi-tasking operating system performs a context switch between two threads. More particularly, when thread A of application program 56a requires access to a PCI device 34a, the operating system writes the high order bits of the PCI device address to two places: (1) the extension register 36 of the PCI host bridge 14 and (2) a memory location associated with thread A. Similarly, when thread B is subsequently started (i.e., thread A is suspended) and desires access to a second PCI device, the operating system writes the high order bits of the second PCI device address to two places: (1) the extension register 36 of the PCI host bridge 14 and (2) a second memory location associated with the second thread.

When a context switch occurs from thread B back to thread A, the operating system retrieves the stored value from the memory location associated with thread A and writes the value to the extension register 36. Therefore, when thread A tries to access its particular PCI device, the proper address value is already located in the extension register and can be concatenated with the CPU output address to access the PCI device.

Figure 3:
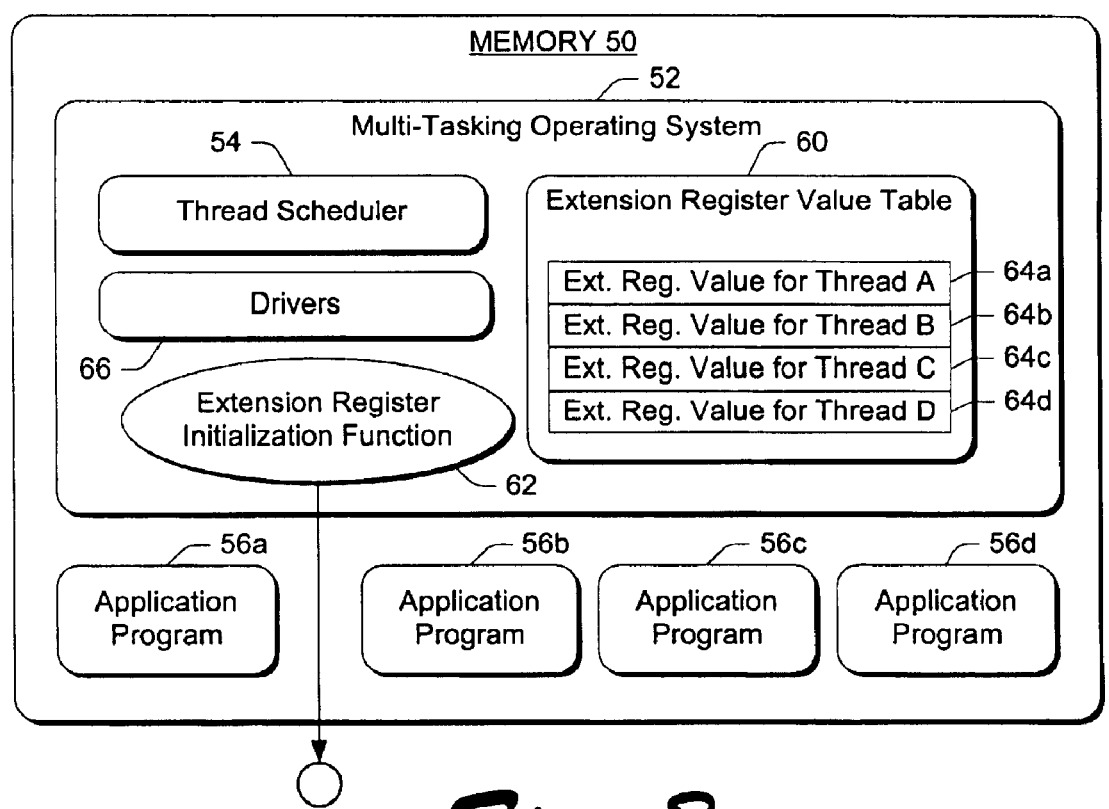
FIG. 3 is a block diagram of the multi-tasking operating system, which shows an extension register initialization function and an extension register value table used in scheduling threads.

FIG. 3 shows the memory 50 and components of the multi-tasking operating system 52 in more detail. In addition to thread scheduler 54, the operating system 52 includes an extension register value table 60 and an extension register initialization function 62. The extension register value table 60 stores unique extension values used to address the PCI devices in association with the application programs that are accessing the PCI devices. In the illustrated example, the table 60 stores extension registration values 64a–64d for the four threads A, B, C, and D associated with application programs 56a–56d. The operating system also includes one or more device drivers 66.

FIGS. 4–6 show a general process for managing the extension register to update values therein with each context switch among multiple threads. FIGS. 4 and 5 illustrate an initializing process when an application thread decides to write to a peripheral device for the first time. FIG. 6 illustrates a process in which the operating system switches contexts among existing threads. The processes are described with additional reference to FIGS. 2 and 3. The processes are performed in software by code embodied in various software components stored in memory, including an application program 56 (or corresponding OS-based thread) (FIG. 4), the extension register initialization function 62 (FIG. 5), and the operating system 52 (FIG. 6).

With reference to FIG. 4, an application program 56a prepares to write data to a peripheral device 34a via the PCI host bridge 14 and PCI bus 32. The application program 56a is executed by a corresponding thread A, which in turn executes under the control and supervision of operating system 52. Prior to utilizing peripheral device 34a, the thread A calls the extension register initialization function 62 and passes in a base address for use by the extension register for properly addressing the peripheral device 34a (step 100 in FIG. 4). The base address might be a full address from which an address extension is calculated, or only the upper bits that form the desired address extension. The initialization function then performs several steps, as discussed below with respect to FIG. 5. Upon completion by the initialization function 62, thread A writes data to or reads data from the peripheral device 34a (step 102 in FIG. 6).

The actual access of PCI devices is often accomplished through the use of operating system device drivers such as drivers 66 shown in FIG. 3. In these situations, the call to register initialization function 62, and the subsequent access to the PCI device itself, is made by the device driver. Each device driver is designed to call register initialization function 62 with a desired base address or address extension prior to accessing a PCI device.

With reference to FIG. 5, when the extension register initialization function 62 is called (step 100 in FIG. 4), the function 62 receives a base address or address extension value for accessing the PCI peripheral device 34a from the thread A (step 110 in FIG. 5). The initialization function 62 then writes the appropriate extension register value to the extension register 36 in PCI host bridge 14 (step 112 in FIG. 5). In the case where register initialization function 62 receives a base address rather than the extension value itself, function 62 calculates the appropriate extension value—in most cases by determining the value of the uppermost bits of the base address.

Contemporaneously with this write operation (step 112), the extension register initialization function 62 writes the received extension register value or base address to a memory location and associates the value with the thread A (step 114 in FIG. 5). In the described implementation, the value is stored in the extension register value table 60 as entry 64a. Although a table is illustrated, it should be understood that other techniques may be used to store the extension value in association with the calling thread.

After the extension register initialization function 62 finishes, control is then returned to the application program thread A to write data to or read data from the peripheral device 34a.

Now, suppose a second application 56b is launched. The thread scheduler 54 of multi-tasking operating system 52 starts another thread B to execute the newly launched application program 56b. In addition, suppose the second application program 56b wants to write data to a second peripheral device 34b over the PCI bus 32. For this to occur, the extension register 36 in PCI host bridge 14 must be updated if and when the thread A currently executing is interrupted by the thread scheduler 54 to execute the second thread B of the second application program 56b.

Prior to any attempt to access the second peripheral device 34b, the thread B calls the extension register initialization function 62 and passes in a base address or extension value for use in properly addressing the peripheral device 34b (i.e., step 100 in FIG. 4). The extension register initialization function 62 writes the received or calculated value to the extension register 36 and to the extension register value table 60 as entry 64b (i.e., steps 112 and 114 in FIG. 5).

With multiple threads executing, the multi-tasking operating system 52 performs context switches between the threads A and B. The operating system 52 executes thread B of the application program 56b until it is completed or until it is interrupted by the thread scheduler 54 to perform a context switch to thread A of the first application program 56a.

FIG. 6 shows a process for updating the extension register in response to context switching performed by the operating system. For discussion purposes, the following example assumes that thread B is currently executing and that the thread next scheduled for execution is thread A of the first application program 56a.

When the multi-tasking operating system 52 performs a context switch from thread B back to thread A, the operating system 52 retrieves the extension register value for thread A from entry 64a of extension register table 60 (step 120 in FIG. 6). The operating system then writes the extension register value to the address extension register 36 so that the thread A will be able to access the first PCI device 34a (step 122 in FIG. 6). The multi-tasking operating system 52 then resumes execution of the thread of the application program 50a (step 124 in FIG. 6).

This context switching process of FIG. 6 may be repeated as desired for however many threads are being executed.

According to another aspect of this invention, a default extension value is utilized for any threads that have not called register initialization function 62. When a thread is initiated, its corresponding entry in table 60 is initialized with this default value. This default value can be overridden by any particular thread, by calling register initialization function 62 prior to accessing a PCI device.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   concurrently executing threads of a plurality of application programs in a computing device having a processor that generates a first address signal of a first width and which is coupled to one or more peripheral devices that are addressed with a second address signal of a second width that is greater than the first width, wherein the second address signal is produced in the computing device by concatenating an address extension from an address extension register with the first address signal, wherein different ones of the threads indicate one or more address extensions to an operating system;
   storing the address extensions for use by the operating system;
   repeatedly switching between execution of the threads; and
   prior to executing a particular thread, writing the address extension of a base address indicated by the particular thread to the extension register.

2. A method as recited in claim 1, wherein the address extensions are indicated as a value of the second width.

3. A method as recited in claim 1, wherein individual address extensions identify address ranges associated with one or more peripheral devices.

4. A method as recited in claim 1, further comprising calling an operating system device driver from one of the threads, wherein the device driver invokes an initialization function to indicate one or more base addresses.

5. A thread scheduler configured to schedule multiple execution threads for interleaved execution by a processor, the thread scheduler performing steps comprising:
   generating, via the processor, a processor address signal that is combined with an extended address signal to create a peripheral address signal, wherein the extended address signal is produced from a value stored in an address extension register and wherein the value is writeable and readable by the processor;
   interrupting a first execution thread to execute portions of one or more other execution threads;
   recording the value from the address extension register to provide a recorded value;
   restoring the recorded value to the extension register after executing said portions of one or more other threads; and
   resuming the first execution thread after restoring the recorded value to the address extension register.

6. A thread scheduler as recited in claim 5, wherein the thread scheduler records address extension register values associated with a plurality of interrupted execution threads and restores the address extension register values to the address extension register when resuming the associated execution threads.

7. One or more computer-readable storage media containing computer-readable code embodying a computer program that implements a thread scheduler that schedules multiple execution threads for interleaved execution by a processor, the thread scheduler performing acts comprising:
   generating, via the processor, a processor address signal that is combined with an extended address signal to create a peripheral address signal, wherein the extended address signal is produced from a value stored in an address extension register, and wherein the value is writeable and readable by the processor;
   interrupting a first execution thread to execute portions of one or more other execution threads;
   recording the value from the address extension register to provide a recorded value;
   restoring the recorded value to the extension register after executing said portions of one or more other threads; and
   resuming the first execution thread after restoring the recorded value to the address extension register.

8. A method of scheduling multiple execution threads for interleaved execution by a processor, wherein the processor generates a processor address signal, comprising:
   executing a first execution thread;
   writing an address extension to an extension register;
   concatenating the address extension with the processor address signal to create a peripheral address signal used by the first execution thread;
   storing the address extension in a location other than the extension register to provide a stored address extension;
   interrupting the first execution thread to execute portions of one or more other execution threads;

interrupting the one or more other execution threads to resume execution of the first execution thread;

restoring the stored address extension to the extension register before resuming executing of the first execution thread; and resuming execution of the first execution thread.

9. A method as recited in claim 8, wherein each address extension identifies an address range associated with one or more peripheral devices.

10. A method as recited in claim 8, farther comprising:

writing a second address extension associated with the one or more other execution threads to the extension register;

concatenating the second address extension with a second processor address signal to create a second peripheral address signal used by the ono or more other execution threads; and storing the second address extension in a second location other than the extension register.

11. A computer-readable storage medium having computer-readable instructions thereon, that when implemented by one or more processors, cause the one or more processors to perform acts for scheduling multiple execution threads for interleaved execution by the one or more processors that generate a processor address signal, comprising acts of:

executing a first execution thread;

writing an address extension to an extension register;

concatenating the address extension with the processor address signal to create a peripheral address signal used by the first execution thread;

storing the address extension in a location other than the extension register to provide a stored address extension;

interrupting the first execution thread to execute portions of one or more other execution threads;

interrupting the one or more other execution threads to resume execution of the first execution thread;

restoring the stored address extension to the extension register before resuming executing of the first execution thread; and resuming execution of the first execution thread.

12. A multi-tasking operating system for use in a computing device having a processor, the operating system being configured to perform steps comprising:

generating, via the processor a first address signal of a first width and one or more peripheral devices that are addressed with a second address signal of a second width that is greater than the first width, wherein the second address signal is produced in the computing device by concatenating an address extension from an address extension resister with the first address signal concurrently executing a plurality of application program threads;

storing address extensions corresponding to different ones of the application program threads;

repeatedly switching between the application program threads; and prior to executing any particular thread, writing the address extension corresponding to that particular thread to the extension register.

13. A multi-tasking operating system as recited in claim 12, further comprising:

a register initialization function that is callable by the threads to specify address extensions.

14. A multi-tasking operating system as recited in claim 12, wherein each address extension identifies an address range associated with one or more peripheral devices.

15. One or more computer-readable storage media containing computer-readable code embodying a multi-tasking operating system for use in a computing device having a processor the operating system being configured to cause the processor to perform acts comprising:

generating a first address signal of a first width and a second address signal of a second width that is greater than the first width, wherein the second address signal is produced in the computing device by concatenating an address extension from an address extension register with the first address signal and one or more peripheral devices that are addressed with the second address signal;

concurrently executing a plurality of application program threads;

storing address extensions corresponding to different ones of the application program threads;

repeatedly switching between the application program threads; and prior to executing any particular thread, writing the address extension corresponding to that particular thread to the extension register.

16. A computing device comprising:

a processor that generates a first address signal having a first width;

one or more peripheral devices that are addressed with a second address signal having a second width that is greater than the first width;

an address extension register that stores an address extension, wherein the address extension is combined with the first address signal to create the second address signal; and the processor being programmed to record the address extension being used by a first execution thread, to interrupt the first execution thread to execute portions of one or more other execution threads, to restore the address extension to the address extension register after executing said portions of one or more other execution threads, and to resume the first execution thread after restoring the address extension to the address extension register.

17. A computing device as recited in claim 16 wherein each address extension identifies an address range associated with one or more peripheral devices.

18. A computing device as recited in claim 16 wherein the processor is further programmed to record and restore address extensions for a plurality of execution threads.

19. A computing device as recited in claim 16 wherein the processor is further programmed to perform the following acts upon interrupting the first execution thread to begin execution of the one or more other execution threads:

recording the address extension being used by the one or more other execution threads; and interrupting the one or more other execution threads to resume the first execution thread.

20. A computing device comprising:

a processor that generates a first address signal having a first width;

one or more peripheral devices that are addressed with a second address signal having a second width that is greater than the first width;

an address extension register that stores an address extension, wherein the address extension is combined with the first address signal to create the second address signal;

a multi-tasking operating system that switches between execution of different application programs; and a plurality of application programs that use different address extensions, wherein execution threads of the application programs register one or more such address extensions with the multi-tasking operating system to provide registered address extensions;

wherein the operating system records the registered address extensions and automatically writes an address extension of a particular application program thread to the address extension register before switching to execution of said particular application program thread.

21. A computing device as recited in claim 20, wherein each address extension identifies an address range associated with one or more peripheral devices.

22. A computing device as recited in claim 20, wherein the operating system records the registered address extensions in a memory table.

23. A computing device as recited in claim 20, wherein the execution threads of the application programs invoke operating system device drivers, the operating system device drivers registering said one or more address extensions with the multi-tasking operating system.

24. A computer program stored in a storage medium and configured for execution on a computer, the computer program being configured, when executed by the computer, to cause the computer to performs acts of:

generating, via the computer, a processor address signal having a first width that is combined with an extended address signal to create a peripheral address signal having a second width that is greater than the first width, wherein the extended address signal is produced from a value stored in an address extension register by combining the extended address signal with the processor address signal, and wherein the value is writeable and readable by the processor;

executing an interruptible execution thread of the program;

writing an address extension value associated with the execution thread to an extension register and contemporaneously to a memory location;

associating the memory location with the execution thread;

retrieving the value associated with the execution thread from the memory location when execution of the execution thread is resumed after being interrupted;

writing the value retrieved from the memory location to the extension register; and resuming application of the execution thread.

25. A computer program as recited in claim 24, wherein each address extension identifies an address range associated with one or more peripheral devices.

26. A computer program as recited in claim 24, the computer program being further configured to cause the computer to perform acts of alternately executing more than one execution thread.

27. A computer program as recited in claim 26, the computer program being further configured to cause the computer to perform an act of storing more than one address extension value in memory, each value being associated with a particular execution thread.

28. A computer program as recited in claim 26, the computer program being further configured to cause the computer to perform acts of:

storing more than one address extension value in memory, each value being associated with a particular execution thread; and loading the extension register with the value in memory associated with a particular execution thread prior to resuming execution of that execution thread.

29. A computer program as recited in claim 26, the computer program being further configured to cause the computer to perform acts of:

storing more than one address extension value in memory, each value being associated with a particular execution thread; and loading the extension register with the value in memory associated with a particular execution thread prior to resuming execution of that execution thread;

wherein each address extension identifies an address range associated with one or more peripheral devices.

30. A computer program as recited in claim 26, wherein the computer program executes an operating system device driver from an interruptible execution thread of the program wherein said device driver identifies a peripheral device to be accessed by the execution thread and identifies a value associated with the execution thread.

31. A computing device comprising;

a processor that generates a first address signal having a first width;

a first peripheral device addressable with a second address signal having a second width that is greater than the first width;

a second peripheral device addressable with a third address signal having a third width that is greater than the first width;

an address extension register configured to store first and second address extensions, each of which may combined with the first address signal to create the second and third address signals, respectively;

a multi-tasking operating system that switches between execution of different application programs;

a plurality of application programs that use different address extensions, wherein execution threads of the application programs register one or more such address extensions with the multi-tasking operating system;

wherein the operating system records the registered address extensions and automatically writes an address extension of a particular application program thread to the address extension register before switching to execution of said particular application program thread.

32. A computing device as recited in claim 31, wherein the first and second address extensions identify an address range associated with the respective first and second peripheral devices.

33. A computing device as recited in claim 31, wherein operating system records the registered address extensions in a memory table.

34. A computing device as recited in claim 31, wherein the execution threads of the application programs invoke operating system device drivers corresponding to the first and second peripheral devices, the operating system device drivers registering the first and second address extensions with the multi-tasking operating system.

35. One or more computer-readable storage media containing computer-readable instructions that, when executed by one or more processors, implement a thread scheduler that schedules multiple execution threads for interleaved execution, the thread scheduler causing acts to be performed comprising:

generating an address signal that is combined with an extended address signal to create a peripheral address signal, wherein the extended address signal is produced from a value stored in an address extension register;

interrupting a first execution thread to execute portions of one or more other execution threads;

recording the value from the address extension register to provide a recorded value; and restoring the recorded value to the extension register after executing said portions of one or more other threads.

36. The computer-readable storage medium of claim 35, wherein the thread scheduler further causes an act of resuming the first execution thread after causing the act of restoring the recorded value to the address extension register to be performed.

37. The computer-readable storage medium of claim 35, wherein the thread scheduler further causes an act of resuming the first execution thread after causing the act of restoring the recorded value to the address extension register to be performed, and wherein the thread scheduler further is configured to cause one or more processors to:

record address extension register values associated with a plurality of interrupted execution threads; and restore the address extension register values to the address extension register when resuming the associated execution reads.

* * * * *